(12) United States Patent
Leforgeais et al.

(10) Patent No.: US 11,982,155 B2
(45) Date of Patent: May 14, 2024

(54) SUBSEA HEATING APPARATUS FOR HEATING A SUBSEA COMPONENT, SUCH AS SUBSEA PIPELINE, RELATED SUBSEA HEATING ASSEMBLY, SUBSEA HEATING SYSTEM, OIL AND GAS PRODUCTION INSTALLATION AND MANUFACTURING METHOD

(71) Applicant: TotalEnergies OneTech, Courbevoie (FR)

(72) Inventors: Bruno Leforgeais, Chatou (FR); Faradj Tayat, Gif sur Yvette (FR)

(73) Assignee: TotalEnergies OneTech, Courbevoie (FR)

( * ) Notice: Subject to any disclaimer, the term of this patent is extended or adjusted under 35 U.S.C. 154(b) by 0 days.

(21) Appl. No.: 17/914,122

(22) PCT Filed: Mar. 24, 2020

(86) PCT No.: PCT/IB2020/000313
§ 371 (c)(1),
(2) Date: Sep. 23, 2022

(87) PCT Pub. No.: WO2021/191650
PCT Pub. Date: Sep. 30, 2021

(65) Prior Publication Data
US 2023/0123313 A1 Apr. 20, 2023

(51) Int. Cl.
*E21B 36/04* (2006.01)
*E21B 36/00* (2006.01)
*F16L 53/34* (2018.01)

(52) U.S. Cl.
CPC ............ *E21B 36/04* (2013.01); *E21B 36/005* (2013.01); *F16L 53/34* (2018.01)

(58) Field of Classification Search
CPC ......... E21B 36/005; E21B 36/04; F16L 53/34
See application file for complete search history.

(56) References Cited

U.S. PATENT DOCUMENTS

| 6,278,095 B1 * | 8/2001 | Bass | F16L 53/37 |
| | | | 219/629 |
| 6,509,557 B1 * | 1/2003 | Bass | E21B 43/01 |
| | | | 392/318 |

(Continued)

FOREIGN PATENT DOCUMENTS

| WO | 2012/064641 A2 | 5/2012 | |
| WO | WO-2016066968 A1 * | 5/2016 | ............ F16L 53/34 |

(Continued)

OTHER PUBLICATIONS

International Search Report issued in International Patent Application No. PCT/IB2020/000313 dated Nov. 4, 2020.

*Primary Examiner* — Matthew R Buck
(74) *Attorney, Agent, or Firm* — TROUTMAN PEPPER HAMILTON SANDERS LLP

(57) ABSTRACT

The invention relates to a subsea heating apparatus for heating a subsea component extending along a longitudinal direction, comprising an induction coupler including a first section with first core part(s) and a second section with second core parts, a respective first magnetic core part being coupled with a second magnetic core part to form a magnetic core ring adapted to surround an electrical conductor to be connected to a power source. At least one component electrical cable associated with the subsea component to be heated and adapted to receive power via the induction coupler for heating the subsea component. The coupler includes several windings each wound around a respective second core part and connected to respective component electrical cable(s). The second section is adapted to be attached to the subsea component and several second core parts are arranged in distinct radial positions around the longitudinal direction.

19 Claims, 4 Drawing Sheets

(56) References Cited

U.S. PATENT DOCUMENTS

| | | |
|---|---|---|
| 10,077,861 B2 | 9/2018 | Heggdal et al. |
| 11,441,719 B2 * | 9/2022 | Pionetti .................. F16L 53/34 |
| 2010/0101663 A1 | 4/2010 | Granborg |
| 2015/0048079 A1 * | 2/2015 | Heggdal ................. F16L 53/37 |
| | | 219/618 |

FOREIGN PATENT DOCUMENTS

| | | |
|---|---|---|
| WO | 2017/14339 A1 | 8/2017 |
| WO | WO-2020152725 A1 * | 7/2020 |

* cited by examiner

US 11,982,155 B2

SUBSEA HEATING APPARATUS FOR HEATING A SUBSEA COMPONENT, SUCH AS SUBSEA PIPELINE, RELATED SUBSEA HEATING ASSEMBLY, SUBSEA HEATING SYSTEM, OIL AND GAS PRODUCTION INSTALLATION AND MANUFACTURING METHOD

CROSS REFERENCE TO RELATED APPLICATION

The present application is a U.S. National Phase Application under 35 U.S.C. § 371 of International Patent Application No. PCT/IB2020/000313 filed Mar. 24, 2020. The entire contents of which are hereby incorporated by reference.

FIELD OF THE INVENTION

The present invention relates to a subsea heating apparatus for heating a subsea component, such as a subsea pipeline.

The invention also relates to a subsea heating assembly comprising a subsea component and such a subsea heating apparatus for heating the subsea component.

The invention also relates to a subsea heating system comprising an electric power source, at least such one subsea heating assembly, and a carrying electrical cable.

The invention also relates to an oil and gas production installation comprising such a subsea heating system and a method for manufacturing such a subsea heating assembly.

BACKGROUND

The invention concerns particularly the field of subsea oil and gas production, or in other words relates to the exploration, drilling and development and production of oil and gas fields in underwater locations.

A subsea oil and gas production installation includes one or several wells with a flow line linked to a fixed platform, to a FPSO (Floating Production Storage and Offloading) or an onshore installation. Such an installation is used to develop reservoirs which require drilling of the wells from more than one location. The wells and the flow line are generally disposed in deep water. The flow line includes for example one or several subsea manifolds and one or several subsea pipelines.

U.S. Pat. No. 10,077,861 B2 concerns a subsea heating set, comprising a component interface cable in association with a subsea component to be heated, such as a subsea pipeline. The component interface cable receives power from an electric power source. The power source comprises an induction coupler with core rings which surround an alternating current carrying source cable, and a winding cable wound around the core ring The winding cable connects to the component interface cable. The induction coupler comprises an upper section with first core parts and a lower section with second core parts. The winding cable is arranged in the upper section. The first core parts are aligned with second core parts when the upper section is landed on the lower section. The upper section is removable from the lower section.

However, the installation of such a subsea heating set is sometimes difficult.

SUMMARY

An object of the invention is therefore to provide a subsea heating apparatus for heating a subsea component, such as a subsea pipeline, which is easier to install in subsea conditions.

For this purpose, the subject-matter of the invention is a subsea heating apparatus for heating a subsea component, such as a subsea pipeline, the subsea component extending along a longitudinal direction, the subsea heating apparatus comprising:

an induction coupler including a first section with a first number of first core part(s) and a second section with a second number of second core parts, at least one first core part which is magnetic being configured to be coupled with at least one respective second core part which is magnetic to form at least one magnetic core ring, each magnetic core ring being adapted to surround a respective carrying electrical conductor intended to be electrically connected to an electric power source, at least one component electrical cable configured to be arranged in association with the subsea component to be heated, each component electrical cable being adapted to receive power from the electric power source via the induction coupler and to heat the subsea component by electric dissipation when receiving power;

wherein the induction coupler includes several windings, each winding being wound around a respective second core part and being connected to one or several respective component electrical cable(s), and wherein the second section is adapted to be attached to the subsea component and several second core parts are arranged in several distinct radial positions, distributed around the longitudinal direction.

Thus, the subsea heating apparatus according to the invention, with its induction coupler including several windings, each winding being wound around a respective second core part and being connected to one or several respective component electrical cable(s), and with its second section adapted to be attached to the subsea component having several second core parts arranged in several distinct radial positions distributed around the longitudinal direction, allows positioning each carrying electrical conductor in an easier manner with respect to the induction coupler.

In particular, the subsea heating apparatus enables to position each carrying electrical conductor substantially along the longitudinal direction, while avoiding having to bend the cable too much when it has to pass through successive induction couplers for successive subsea components to be heated. The successive components, such as subsea pipelines, are typically connected one to the other along the longitudinal direction, while being potentially radially offset from each other around the longitudinal direction.

According to other advantageous aspects of the invention, the subsea heating apparatus comprises one or several of the following features, taken individually or according to any technically possible combination:

the second number of second core parts is strictly greater than the first number of first core part(s);

the second number of second core parts is greater than or equal to the first number of first core part(s) plus 2;

each second core part is a magnetic core part;

each first core part is a magnetic core part;

the first number of first core part(s) is between 1 and 3, the number of carrying electrical conductor(s) being between 1 and 3;

at least one first core part is a non-magnetic core part;

the number of first magnetic core part(s) is strictly smaller than the number of carrying electrical conductor(s), so as to transmit to the at least one component electrical cable only a part of the power from the electric power source;

the first number of first core part(s) is between Q+1 and Q+3, where Q is the number of first non-magnetic core part(s), the number of carrying electrical conductor(s) being between 1 and 3;

several second core parts are arranged along a radial angular portion whose angle (β) is substantially between 60° and 270°, preferably substantially between 90° and 180°;

the second section is in the shape of an arc of a circle or an arc of an oval, the subsea component to be heated being preferably a subsea pipeline;

the subsea heating apparatus comprises several component electrical cables connected in parallel to the induction coupler; and the first section is removable from the second section.

The subject-matter of the invention is also a subsea heating assembly comprising a subsea component, such as a subsea pipeline, and a subsea heating apparatus for heating the subsea component, the subsea heating apparatus being as defined above;

the subsea component being preferably equipped with an insulation layer, each component electrical cable being positioned in contact with the subsea component, the insulation layer surrounding the subsea component and the component electrical cable(s).

The subject-matter of the invention is also a subsea heating system comprising:

an electric power source;

at least one subsea heating assembly, each subsea heating assembly being as defined above; and a carrying electrical cable, electrically connected to the electric power source and configured to be coupled to each subsea heating apparatus.

The subject-matter of the invention is also an oil and gas production installation or pipeline, comprising:

at least one subsea production well, each one being configured for extracting oil and gas; and/or at least one subsea manifold, each one being connected to one or several subsea production wells; and a subsea heating system as defined above, wherein each subsea component is a subsea pipeline for transporting the extracted oil and/or gas, each subsea pipeline being connected to at least one of element among the group consisting of: a corresponding subsea manifold; at least one riser, each one being connected to one or several subsea pipelines; an offshore facility; and an onshore facility.

The subject-matter of the invention is also a method for manufacturing a subsea heating assembly, the subsea heating assembly being as defined above, the method comprising:

attaching the second section to the subsea component and positioning each component electrical cable in contact with the subsea component;

surrounding the subsea component and the component electrical cable(s) with the insulation layer; and positioning the first section with regard to the second section around one or several electrical conductors of an electrical cable.

BRIEF DESCRIPTION OF THE DRAWINGS

The invention will be better understood upon reading of the following description, which is given solely by way of example and with reference to the appended drawings, wherein.

DETAILED DESCRIPTION

In the following, the expression "substantially equal to" defines an equality relation to more or less 10%, preferably to more or less 5%.

Figure 1:
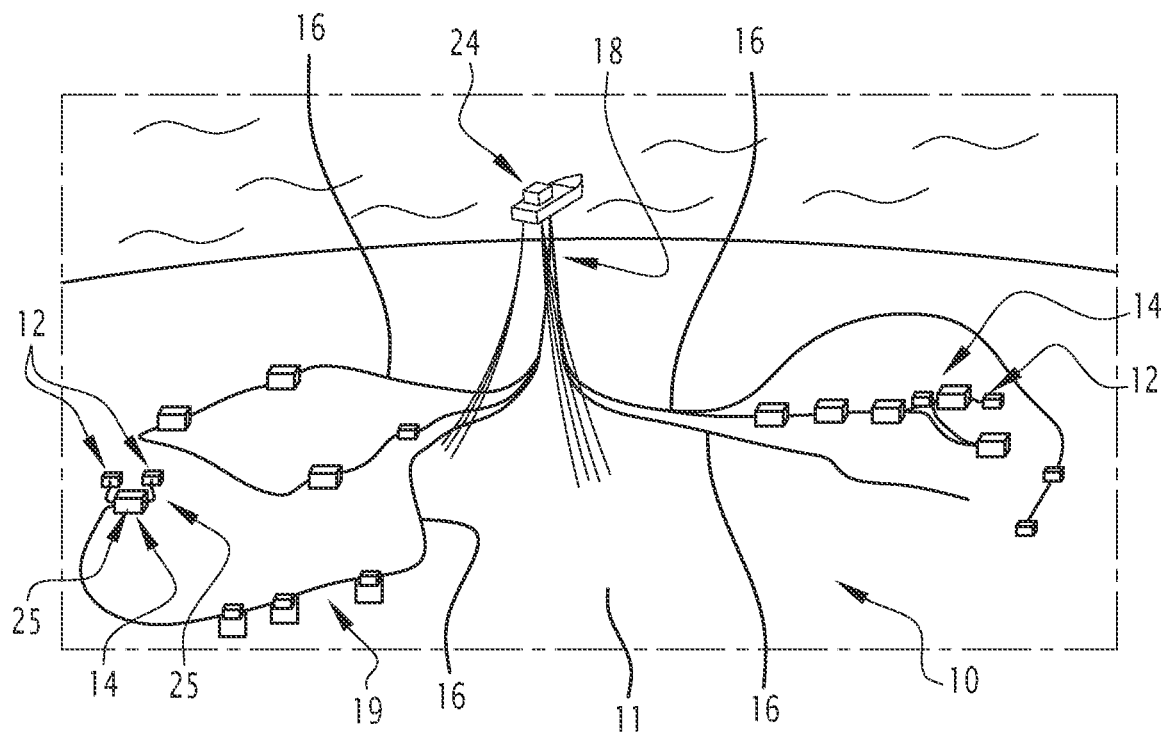
FIG. 1 is a schematic view of an oil and gas production installation, according to the invention, including several subsea production wells, several manifolds connected to the production wells, a subsea heating system including several subsea pipelines connected to the manifolds for transporting the oil or the gas extracted via the production wells and a riser connected to the pipelines.

In FIG. 1, an oil and gas production installation 10 is disposed on an oil or gas field 11. The oil and gas production installation 10 includes several subsea production wells 12 and several manifolds 14 connected to the production wells 12. The oil and gas production installation 10 includes several subsea pipelines 16 for transporting the oil or gas extracted via the production wells 12, some of the pipelines 16 being connected to the manifolds 14.

The oil and gas production installation 10 also includes a riser 18 connected to some pipelines 16. The production wells 12, the manifolds 14 and the pipelines 16 form a flow line 19 for extracting and transporting the oil or the gas.

Figure 2:
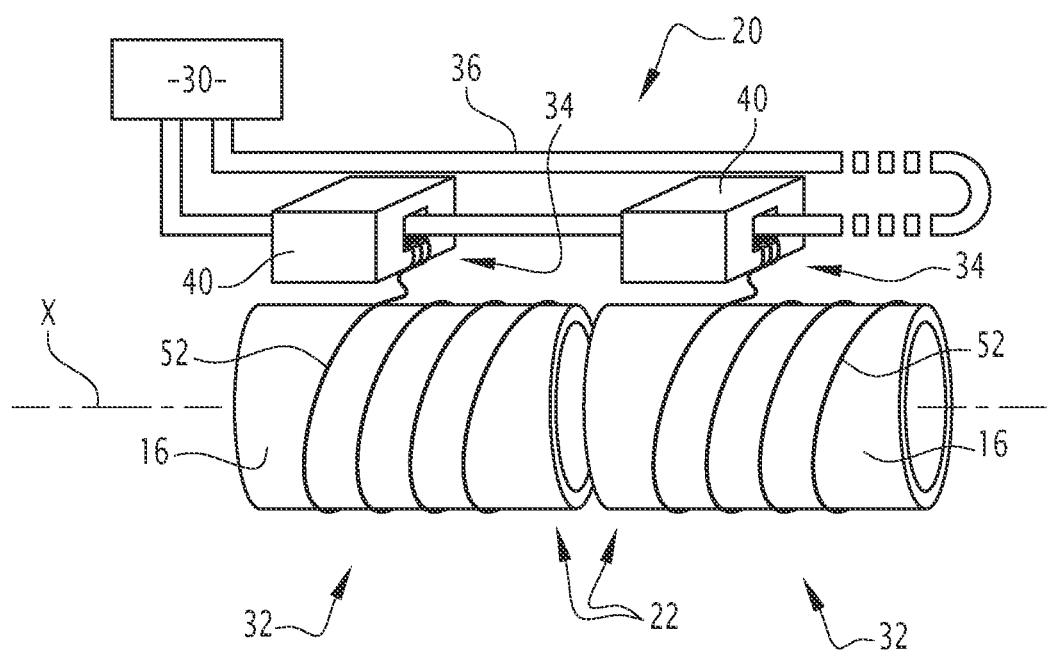
FIG. 2 is a schematic view of the subsea heating system of FIG. 1, comprising an electric power source, several subsea heating assemblies, each subsea heating assembly including a subsea component, such as a subsea pipeline, and a subsea heating apparatus for heating the subsea component, and a carrying electrical cable electrically connected to the electric power source and configured to be coupled to each subsea heating apparatus.

The oil and gas production installation 10 also includes a subsea heating system 20, shown in FIG. 2, including in particular at least one subsea component 22 to be heated, such as a subsea pipeline 16.

In the example of FIG. 1, the oil and gas production installation 10 also includes a Floating Production Storage and Offloading 24, usually called FPSO.

Each production well 12 is configured for extracting oil or gas from the oil or gas field 11. Each production well 12 is well known and will not be described in further detail.

Each manifold 14 is connected to one or several subsea production wells 12 via respective jumpers 25 as known per se.

Each subsea pipeline 16 is adapted for transporting the oil or gas extracted from the oil or gas field 11. Each subsea pipeline 16 is more generally adapted for transporting single-phase or multiphase substances.

Figure 3:
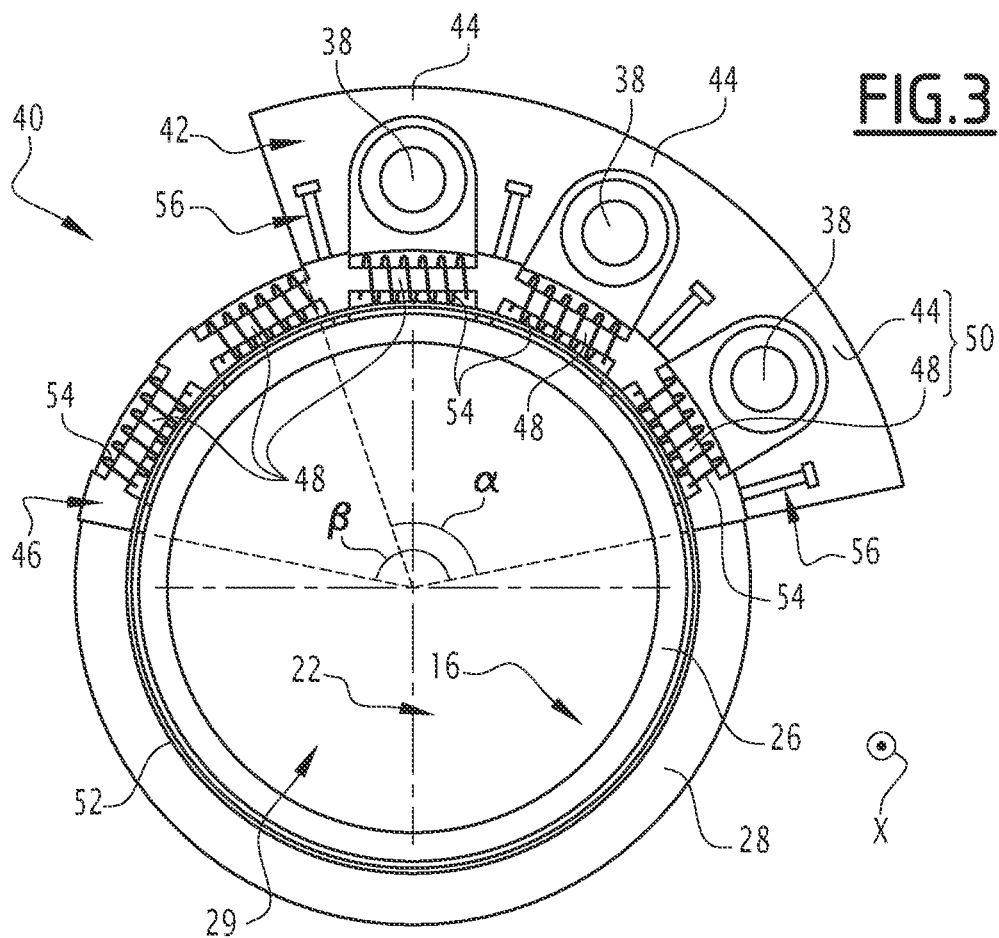
FIG. 3 is a schematic cross-section view of a respective subsea heating assembly of FIG. 2, the subsea heating apparatus comprising an induction coupler including a first section with a first number of first core part(s) and a second section with a second number of second core parts, at least one first magnetic core part being coupled with at least one respective second magnetic core part to form at least one magnetic core ring, each one surrounding a respective carrying electrical conductor, at least one component electrical cable arranged in association with the subsea component and adapted to receive power from the electric power source via the induction coupler, the induction coupler including several windings, each winding being wound around a respective second core part and connected to one or several respective component electrical cable(s), and the second section being attached to the subsea component, with several second core parts arranged in several distinct radial positions distributed around the longitudinal direction; the first section being positioned in a first position with respect to the second section.
Figure 4:
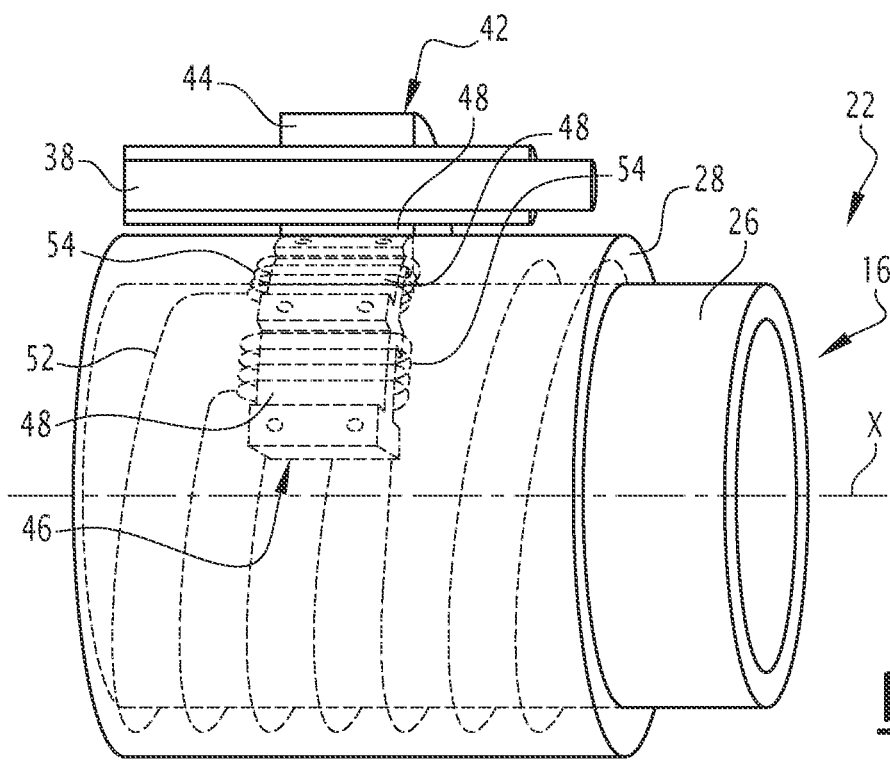
FIG. 4 is a schematic lateral view of the subsea heating assembly of FIG. 3.

Each subsea pipeline 16 comprises a metallic body 26 and is preferably equipped with an insulation layer 28 surrounding the metallic body 26, the metallic body 26 having an inner duct 29 for transporting the extracted oil or gas, as shown in FIGS. 3 and 4. The metallic body 26 is generally cylindrical and the insulation layer 28 is an electrical insulator. Each subsea pipeline 16, and more generally each subsea component 22, extends in a longitudinal direction X, shown in FIGS. 2 to 7.

Some subsea pipelines 16 are connected to the manifolds 14 and some subsea pipelines 16 are connected to other subsea pipelines 16.

Several risers 18 are connected to several subsea pipelines 16, flow lines or other subsea system which needs a riser. Risers are configured for transporting the extracted oil or gas up to the FPSO 24. The risers 18 are well known and will not be described in further detail.

In FIG. 2, the subsea heating system 20 comprises an electric power source 30, at least one subsea heating assembly 32, each subsea heating assembly 32 comprising a respective subsea component 22, such as a respective subsea pipeline 16, and a respective subsea heating apparatus 34 for heating the respective subsea component 22.

In the example of FIG. 2, the subsea heating system 20 comprises several subsea heating assemblies 32, namely two subsea heating assemblies 32, wherein the several subsea components 22 are configured to be connected one to the other along the longitudinal direction X.

The subsea heating system 20 also comprises a carrying electrical cable 36, electrically connected to the electric power source 30 and configured to be coupled to each subsea heating apparatus 34. The carrying electrical cable 36 comprises one or several carrying electrical conductors 38, visible in FIGS. 3 to 7.

Each subsea component 22, such as each subsea pipeline 16, has for example a length equal to 12 meters, 24 meters or 48 meters.

Each subsea component 22, such as each subsea pipeline 16, is preferably metallic, which allows a good heat conduction, when the subsea component 22 is heated by electric dissipation of component electrical cable(s) 52 receiving power from the electric power source 30 via a respective carrying electrical conductor 38 receiving power and via a respective induction coupler 40.

Each subsea component 22, such as each subsea pipeline 16, is preferably equipped with a respective insulation layer 28.

The insulation layer 28 is for example made of epoxy, multi-layer polyethylene, Fluoropolymer, multi-layer polypropylene (or polypropylene foam), polyurethane (glass reinforced or not).

The electric power source 30 is for example an AC power source. According to this example, the frequency of the electric power source 30 is typically between 50 Hz and 60 Hz. Alternatively, the frequency of the electric power source 30 is higher than these general frequencies of 50 Hz or 60 Hz, up to 500 Hz.

The electric power source 30 has a voltage typically between 0.1 kV and 200 kV.

The electric power source 30 is for example a multi-phase power source and the number of carrying electrical conductors 38 forming the carrying electrical cable 36 is typically equal to the number P of phases of the power source 30. In the example of FIGS. 3 to 7, the electric power source 30 is a three-phase power source and the carrying electrical cable 36 has three carrying electrical conductors 38.

Alternatively, the electric power source 30 is a single-phase power source, and the carrying electrical cable 36 has for example two carrying electrical conductors 38, or alternatively a single carrying electrical conductor 38.

Each subsea heating apparatus 34 comprises an induction coupler 40 including a first section 42 with a first number N1 of first core part(s) 44 and a second section 46 with a second number N2 of second core parts 48, at least one first core part 44 which is magnetic being configured to be coupled with at least one respective second core part 48 which is magnetic to form at least one magnetic core ring 50, each magnetic core ring 50 being adapted to surround a respective carrying electrical conductor 38 intended to be electrically connected to the electric power source 30.

Each subsea heating apparatus 34 also comprises at least one component electrical cable 52 configured to be arranged in association with the subsea component 22 to be heated, each component electrical cable 52 being adapted to receive power from the electric power source 30 via the induction coupler 40 and to heat the subsea component 22 by electric dissipation when receiving power.

Figure 7:
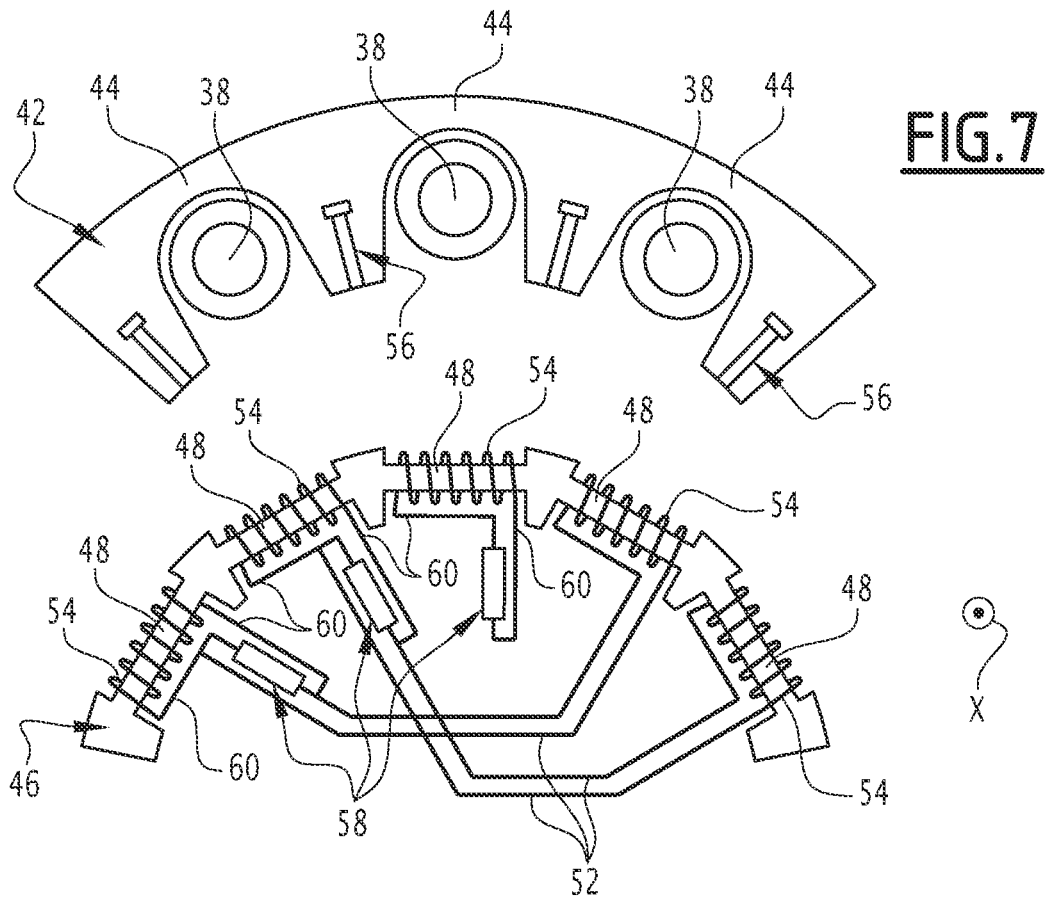
FIG. 7 is a view representing the connection of several component electrical cables to several windings wound around respective second core parts.

In the example of FIGS. 4 and 7, the subsea heating apparatus 34 comprises several component electrical cables 52 connected in parallel to the induction coupler 40.

The induction coupler 40 includes several windings 54, each winding 54 being wound around a respective second core part 48 and being connected to one or several respective component electrical cable(s) 52. In the example of FIG. 4, each component electrical cable 52 is connected to a respective winding 54. In the example of FIG. 7, several component electrical cables 52 are connected to a respective winding 54.

The induction coupler 40 includes fastening means 56 for fastening the first section 42 to the second section 46, as shown in FIG. 3. The fastening means 56 are typically quick fastening means for allowing a quick release of the first section 42 with respect to the second section 46, the first section 42 is removable from the second section 46.

In the example of FIG. 7, the induction coupler 40 also includes heating cables represented by respective resistors 58 in the electric scheme of FIG. 7.

The first section 42 is preferably in the shape of an arc of a circle, as shown in FIGS. 3 and 5 to 7, or in the shape of an arc of an oval.

The first section 42 extends along a first radial angular portion with a first angle α which is for example substantially between 30° and 240°, preferably substantially between 60° and 150°. In the example of FIGS. 3 and 5 to 7, the first angle α is substantially equal to 90°.

The first number N1 of first core part(s) 44 is an integer greater than or equal to 1.

Each first core part 44 is for example a magnetic core part. According to this example, the first number N1 of first core part(s) 44 is preferably between 1 and 3, the number of carrying electrical conductor(s) 38 being preferably between 1 and 3.

In other words, when each first core part 44 is magnetic, the first number N1 of first core part(s) 44 is typically equal to the number P of phases of the power source 30, which is preferably between 1 and 3.

In the example of FIGS. 3 and 5 to 7, each first core part 44 is magnetic.

As a variant, not shown, at least one first core part 44 is a non-magnetic core part. According to this variant, the number of first magnetic core part(s) is for example strictly smaller than the number of carrying electrical conductor(s) 38, so as to transmit to the at least one component electrical cable 52 only a part of the power from the electric power source 30. In the case of the carrying electrical cable 36 with three carrying electrical conductors 38, a single or two first magnetic core parts are provided for each subsea component 22 to be heated so as to transmit to the component electrical cable(s) 52 for said subsea component 22 only a third or two thirds of the power from the electric power source 30. In other words, in this case, the single or the two first magnetic core parts are coupled with respective second magnetic core part(s) 48 to form respective magnetic core ring(s) 50 adapted to surround respective carrying electrical conductor(s) 38, while two or a single non-magnetic core parts are coupled with respective second core part(s) 48 to form respective non-magnetic core ring(s) surrounding respective carrying electrical conductor(s) 38. The skilled person will understand that said respective non-magnetic core ring(s) are therefore not able to transmit power from the electric power source 30 to the component electrical cable(s) 52.

In optional addition, the respective non-magnetic core ring(s) are surrounding different carrying electrical conductor(s) 38 from one subsea component 22 to the other, so as to balance the power required from each phase of the electric power source 30. According to this optional addition, assuming a three-phase electric power source 30 and that a single non-magnetic core ring is configured to surround a single respective carrying electrical conductor 38 for each subsea component 22, such respective single non-magnetic core ring is intended to surround the respective carrying electrical conductor 38 of a first phase of the electric power source 30 for a third of the number of subsea components 22; such respective single non-magnetic core ring being intended to surround the respective carrying electrical conductor 38 of a second phase of the electric power source 30 for another third of the number of subsea components 22; and such respective single non-magnetic core ring being intended to surround the respective carrying electrical conductor 38 of a third phase of the electric power source 30 for the last third of the number of subsea components 22. In this case, two thirds of the power from the electric power source 30 are intended to be transmitted to the component electrical cable(s) 52 for each subsea component, without taking into consideration the magnetic losses in the induction coupler 40.

According to this optional addition, assuming a three-phase electric power source 30 and conversely that a single magnetic core ring is configured to surround a single respective carrying electrical conductor 38 for each subsea component 22, such respective single magnetic core ring is intended to surround the respective carrying electrical conductor 38 of a first phase of the electric power source 30 for a third of the number of subsea components 22; such respective single magnetic core ring being intended to surround the respective carrying electrical conductor 38 of a second phase of the electric power source 30 for another third of the number of subsea components 22; and such respective single magnetic core ring being intended to surround the respective carrying electrical conductor 38 of a third phase of the electric power source 30 for the last third of the number of subsea components 22. In this case, one third of the power from the electric power source 30 is intended to be transmitted to the component electrical cable(s) 52 for each subsea component, without taking into consideration the magnetic losses in the induction coupler 40.

According to this variant wherein at least one first core part 44 is a non-magnetic core part, each first non-magnetic core part is for example arranged between two first magnetic core parts in order to improve non-magnetic isolation between two first magnetic core parts.

According to this variant, the first number N1 of first core part(s) 44 is for example between Q+1 and Q+3, where Q is the number of first non-magnetic core part(s), the number of carrying electrical conductor(s) 38 being preferably between 1 and 3. According to this variant, the skilled person will observe that only respective first magnetic core part(s) coupled with respective second magnetic core part(s) are intended to be arranged around respective carrying electrical conductor(s) 38, while each first non-magnetic core part is intended to surround no carrying electrical conductor 38. In other words, according to this variant, the first number N1 of first core part(s) 44 is typically equal Q+P, wherein P represents the number of phases of the power source 30 and Q represents the number of first non-magnetic core part(s).

When the first number N1 of first core part(s) 44 is greater than or equal to 2, the first core parts 44 are arranged in several distinct radial positions, distributed around the longitudinal direction X. The first core parts 44 substantially radially extend along the first angle α, the first core parts 44 being radially arranged one after the other.

The first core parts 44 are preferably equally distributed around the longitudinal direction X. In other words, each first core part 44 substantially radially extends along the first angle α divided by the first number N1.

In the example of FIGS. 3 and 5 to 7, the first core parts 44 are preferably made of a single piece of material. According to this example, the first section 42 is a single piece of material. The first section 42 is made of a magnetic material, for example a magnetic material configured for being used in a transformer core, such as soft steel, soft iron, a silicon sheet, a grain oriented sheet, an amorphous sheet, a mixture of some of the aforementioned materials, or even ferrite.

The second section 46 is adapted to be attached to the subsea component 22 and several second core parts 48 are arranged in several distinct radial positions, distributed around the longitudinal direction X.

The second section 46 is preferably in the shape of an arc of a circle, as shown in FIGS. 3 and 5 to 7, or in the shape of an arc of an oval.

The second section 46 extends along a second radial angular portion with a second angle β greater than or equal to the first angle α. The second angle β is for example substantially between 60° and 270°, preferably substantially between 90° and 180°. In the example of FIGS. 3 and 5 to 7, the second angle α is substantially equal to 150°.

The second number N2 of second core parts 48 is for example strictly greater than the first number N1 of first core part(s) 44. The second number N2 is therefore an integer greater than or equal to 2.

The second number N2 is preferably greater than or equal to the first number N1 plus 2. Accordingly, in the example of FIGS. 3 to 7, the second number N2 is equal to 5, while the first number N1 is equal to 3.

Alternatively, the second number N2 of second core parts 48 is equal to the first number N1 of first core part(s) 44. According to his alternative, the second angle β is substantially equal to the first angle α. Each second core part 48 is preferably a magnetic core part.

The second core parts 48 substantially radially extend along the second angle β, the second core parts 48 being radially arranged one after the other.

The second core parts 48 are preferably equally distributed around the longitudinal direction X. In other words, each second core part 48 substantially radially extends along the second angle β divided by the second number N2.

In the example of FIGS. 3 and 5 to 7, the second core parts 48 are preferably made of a single piece of material. According to this example, the second section 46 is a single piece of material. The second core parts 48 are made of a magnetic material, for example a magnetic material configured for being used in a transformer core, such as soft steel, soft iron, a silicon sheet, a grain oriented sheet, an amorphous sheet, a mixture of some of the aforementioned materials, or even ferrite.

The second section 46 is for example made in a molded box, not shown, with a total radial thickness adapted to a radial thickness of the insulation layer 28. In other words, the radial thickness of the molded box is smaller than the radial thickness of the insulation layer 28.

Each component electrical cable 52 is for example a low-voltage cable, such as cable for a voltage lower than 100 V, preferably lower than 50 V, even if higher voltages are also suitable.

The cross-section of each component electrical cable 52 has, for example, an area between 1 mm² and 6 mm².

Each component electrical cable 52 is configured to be positioned in contact with the subsea component 22. Each insulation layer 28 is then configured to surround the respective subsea component 22 and component electrical cable(s) 52. The skilled person will observe that component electrical cable(s) 52 do not necessarily have an insulating sheath, each component electrical cable 52 being also adapted to be a bare wire without insulation, said wire being embedded in insulation layer 28 according to this variant.

Each component electrical cable 52 is for example wound in the form of a spiral, such as a helical spiral, around the subsea component 22. Alternatively, each cable 52 is arranged in the form of a boustrophedon in contact with the subsea component 22.

Figure 8:
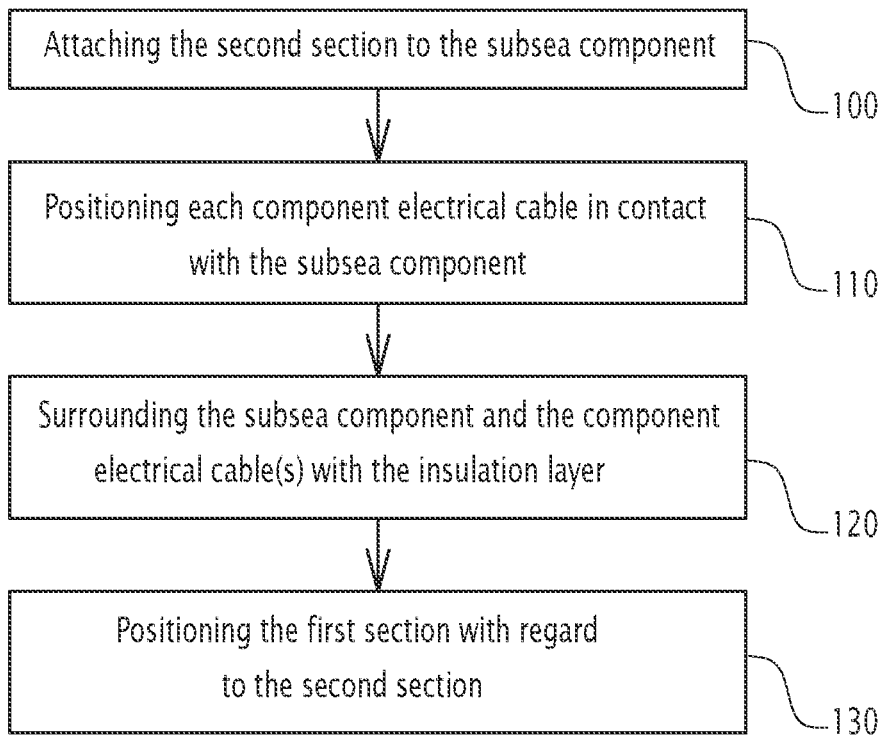
FIG. 8 is a flowchart of a method according to the invention for manufacturing a respective subsea heating assembly.

The manufacturing of a respective subsea heating assembly 32 will now be explained in view of FIG. 8 representing a flowchart of a method, according to the invention, for manufacturing a respective subsea heating assembly 32.

In an initial step 100, a respective second section 46 is attached to a respective subsea component 22, such as a respective subsea pipeline 16, for example by welding, using screws, strapping or any other well-known fixing method.

In a subsequent step 110, each component electrical cable 52 is positioned in contact with the respective subsea component 22, for example by bonding or strapping or using well-known fixing means. Each component electrical cable 52 is for example wound in the form of a spiral around the subsea component 22, or arranged in the form of a zigzag in contact with the subsea component 22 or even straight depending on the necessary heat exchanges.

The skilled person will understand that the steps 100 and 110 can be performed indifferently in any order with respect to each other. In other words, steps 100 and 110 can alternatively be reversed with respect to each other.

After the steps 100 and 110, the subsea component 22 and the component electrical cables 52 are, during next step 120, surrounded with the insulation layer 28.

Lastly, after the installation of the respective carrying electrical conductor(s) 38 inside the respective first core part(s) 44 of the first section 42, the first section 42 is positioned, during next step 130, with regard to the second section 46.

During this step 130, each first core part 44 which is magnetic is coupled with a respective second core part 48 which is magnetic to form a respective magnetic core ring 50, each magnetic core ring 50 therefore surrounding a respective carrying electrical conductor 38 when the first section 42 is positioned in contact with the second section 46.

Figure 5:
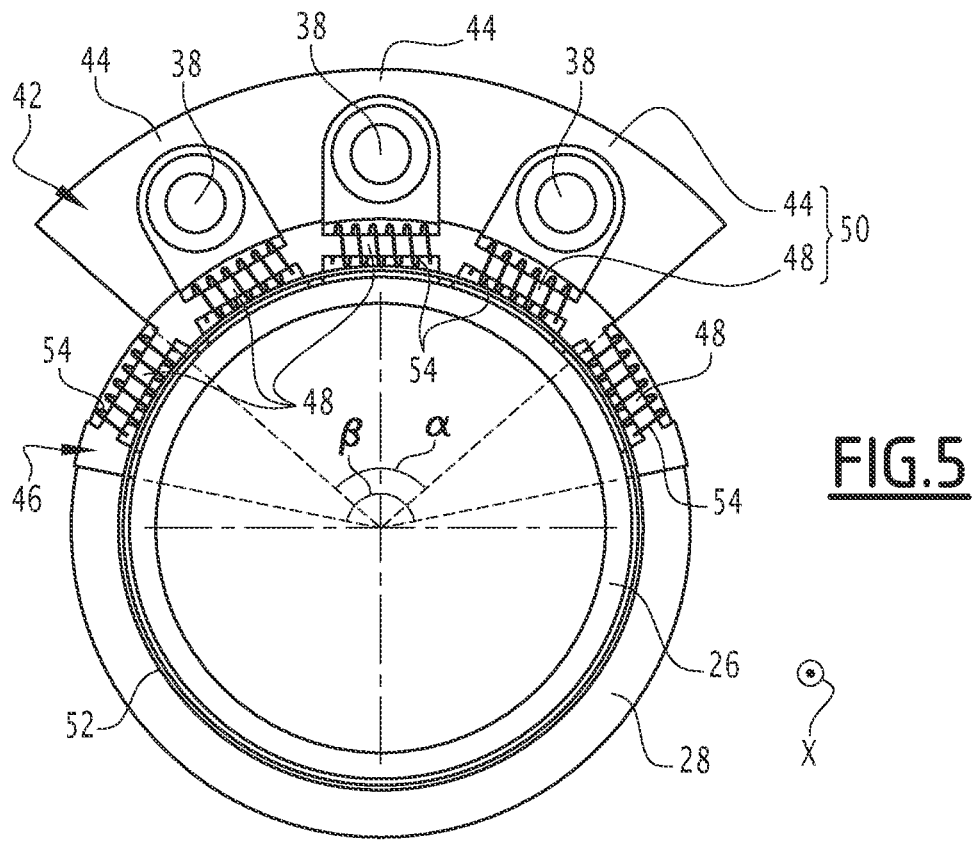
FIG. 5 is a similar view to the one of FIG. 3, the first section being positioned in a second position with respect to the second section.
Figure 6:
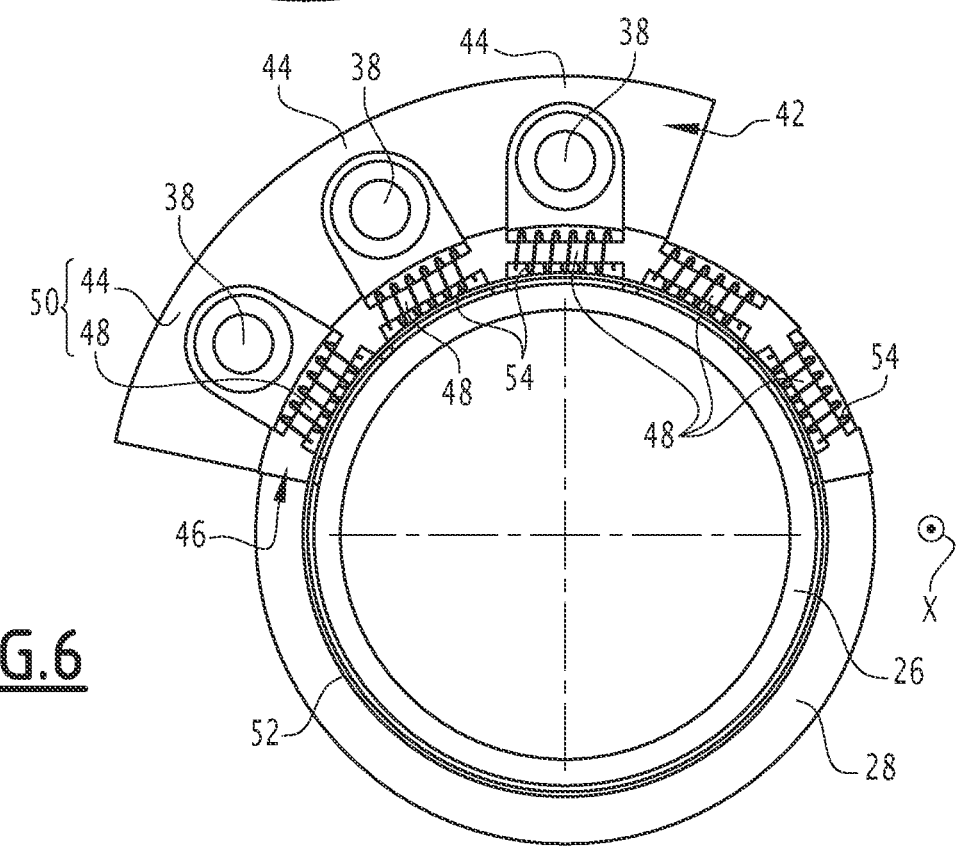
FIG. 6 is a similar view to the one of FIG. 3, the first section being positioned in a third position with respect to the second section.

Thus, the subsea heating apparatus 34 according to the invention, with its induction coupler 40 including several windings 54, each winding 54 being wound around a respective second core part 48 and being connected to one or several respective component electrical cable(s) 52, and with its second section 46 having several second core parts 48 arranged in several distinct radial positions distributed around the longitudinal direction X, allows positioning each carrying electrical conductor 38 in an easier manner with respect to the induction coupler 40, as it is apparent from FIGS. 3, 5 and 6 showing different possible radial positions around the longitudinal direction X of the first section 42 with respect to the second section 46.

Indeed, FIG. 3 illustrates a first position, also called right position, of the first section 42 with respect to the second section 46. In FIG. 5, the first section 42 is positioned in a second position, also called middle position, with respect to the second section 46; and FIG. 6 shows a third position, also called left position, of the first section 42 with respect to the second section 46.

More generally, the skilled person will understand that the number of different possible radial positions around the longitudinal direction X of the first section 42 with respect to the second section 46 is equal to (N2−N1+1), where N1 is the first number of first core part(s) 44 and N2 is the second number of second core parts 48.

The plurality of possible radial positions around the longitudinal direction X of the first section 42 with respect to the second section 46 also makes it possible to compensate for radial misalignment of the subsea pipelines 16 when they are connected to each other.

In particular, the subsea heating apparatus 14 enables to position each carrying electrical conductor 38 substantially along the longitudinal direction X, while avoiding having to bend the carrying electrical cable 36 too much when it has to pass through successive induction couplers 40 for successive subsea components 22 to be heated. The successive components 22, such as subsea pipelines 16, are typically connected one to the other along the longitudinal direction X, while being potentially radially offset from each other around the longitudinal direction X.

In addition, the subsea heating system 20 allows heating capacities of up to 500 W/m and up to 1000 km, by assembling the subsea heating assemblies 32 one after the other.

Further, each subsea heating apparatus 34 can be completely pre-installed and factory tested on standard lengths of subsea pipeline 16, such as 12 m, 24 m or 48 m, or any other pre-manufactured length, before each pipeline 16 is insulated. A test can be performed after insulation and before final assembly on the boat/site. Assembly operations on boat/site do not require any particular qualification.

The subsea heating system 20 according to the invention therefore allows an optimized constructability and is adapted to various types of subsea pipeline installations. The subsea heating system 20 according to the invention, in particular each subsea heating apparatus 34, is therefore designed to be perfectly integrated on a wide configuration of installation boats, such as J-Lay, S-Lay and Reel-Lay installations.

The subsea heating system 20 also avoids any risk of insulation breakdown thanks to the low voltage or even very low voltage range used in each second section 46.

Further, the electric power source 30, with a fixed or variable amplitude and frequency, allows the electrical energy transmitted to the various subsea heating apparatuses 34 to be adjusted and controlled.

The first section 42 is removable from the second section 46, for example for installing each carrying electrical conductor 38 between the respective first 44 and second 48 core parts in an easier manner.

In addition, the radial thickness of the second section 46 is smaller than or equal to the radial thickness of the insulation layer 28. In other words, the second section 46 is embedded in the thickness of the insulation layer 28, which avoids creating obstacles when the subsea component 22, such as the subsea pipeline 16, passes through installation tools.

One can thus see that the subsea heating apparatus 14 according to the invention is easier to install in subsea conditions and also allows an easier installation of the carrying electrical cable 36.

The invention claimed is:

1. A subsea heating apparatus for heating a subsea component extending along a longitudinal direction, the subsea heating apparatus comprising:
    an induction coupler including a first section with a first number of first core part(s) and a second section with a second number of second core parts, at least one first core part which is magnetic being configured to be coupled with at least one respective second core part which is magnetic to form at least one magnetic core ring, the at least one magnetic core ring being adapted to surround a respective carrying electrical conductor intended to be electrically connected to an electric power source,
    at least one component electrical cable configured to be arranged in association with the subsea component to be heated, the at least one component electrical cable being adapted to receive power from the electric power source via the induction coupler and to heat the subsea component by electric dissipation when receiving power;
    wherein the induction coupler includes several windings, each winding being wound around a respective second core part and being connected to the at least one component electrical cable, and
    wherein the second section is adapted to be attached to the subsea component and several second core parts are arranged in several distinct radial positions, distributed around the longitudinal direction.

2. The subsea heating apparatus according to claim 1, wherein the second number of second core parts is strictly greater than the first number of first core part(s).

3. The subsea heating apparatus according to claim 2, wherein the second number of second core parts is greater than or equal to the first number of first core part(s) plus 2.

4. The subsea heating apparatus according to claim 1, wherein each second core part is a magnetic core part.

5. The subsea heating apparatus according to claim 1, wherein each first core part is a magnetic core part.

6. The subsea heating apparatus according to claim 5, wherein the first number of first core part(s) is between 1 and 3, the number of carrying electrical conductor(s) being between 1 and 3.

7. The subsea heating apparatus according to claim 1, wherein at least one first core part is a non-magnetic core part.

8. The subsea heating apparatus according to claim 7, wherein the number of the at least one first core part which is magnetic is strictly smaller than the number of carrying electrical conductor(s), so as to transmit to the at least one component electrical cable only a part of the power from the electric power source.

9. The subsea heating apparatus according to claim 7, wherein the first number of first core part(s) is between Q+1 and Q+3, where Q is the number of first non-magnetic core part(s), the number of carrying electrical conductor(s) being between 1 and 3.

10. The subsea heating apparatus according to claim 1, wherein several second core parts are arranged along a radial angular portion whose angle is substantially between 60° and 270°.

11. The subsea heating apparatus according to claim 1, wherein the second section is in the shape of an arc of a circle or an arc of an oval.

12. The subsea heating apparatus according to claim 11, wherein the subsea heating apparatus comprises several component electrical cables connected in parallel to the induction coupler.

13. A subsea heating assembly comprising a subsea component and a subsea heating apparatus for heating the subsea component,
    wherein the subsea heating apparatus is according to claim 1.

14. A subsea heating system comprising:
    an electric power source;
    at least one subsea heating assembly, each subsea heating assembly being according to claim 13; and
    a carrying electrical cable, electrically connected to the electric power source and configured to be coupled to each subsea heating apparatus.

15. An oil and gas production installation, comprising:
    at least one subsea production well, the at least one subsea production well being configured for extracting oil and/or gas; and/or at least one subsea manifold, the at least one subsea manifold being connected to one or several subsea production wells; and
    a subsea heating system according to claim 14, wherein each subsea component is a subsea pipeline for transporting the extracted oil and/or gas, each subsea pipeline being connected to at least one element among the group consisting of: a corresponding subsea manifold; at least one riser, each one being connected to one or several subsea pipelines; an offshore facility; and an onshore facility.

16. A method for manufacturing a subsea heating assembly according to claim 13, the method comprising:
   attaching the second section to the subsea component and positioning each component electrical cable in contact with the subsea component;
   surrounding the subsea component and the component electrical cable(s) with an insulation layer; and
   positioning the first section with regard to the second section around one or several electrical conductors of an electrical cable.

17. The subsea heating apparatus according to claim 10, wherein the angle is substantially between 90° and 180°.

18. The subsea heating apparatus according to claim 11, wherein the subsea component to be heated is a subsea pipeline.

19. The subsea heating assembly according to claim 13, wherein the subsea component is equipped with an insulation layer, each component electrical cable being positioned in contact with the subsea component, the insulation layer surrounding the subsea component and the component electrical cable(s).

* * * * *